United States Patent [19]  
Van Kamp et al.

[11] 3,917,657  
[45] Nov. 4, 1975

[54] 16-METHYLENE-17-ACYLOXY-9β,10-α-PREGNA-4,6-DINENE-3,20 DIONES AND METHODS OF PRODUCING SAME

[75] Inventors: Harmen Van Kamp; Anna Maria DeWachter, both of Weesp, Netherlands

[73] Assignee: U.S. Philips Corporation, New York, N.Y.

[22] Filed: Apr. 10, 1973

[21] Appl. No.: 349,806

Related U.S. Application Data

[63] Continuation of Ser. No. 120,676, March 3, 1971, abandoned.

[30] Foreign Application Priority Data

Mar. 4, 1970 Netherlands.................. 7003060

[52] U.S. Cl. ........ 260/397.4; 424/243; 260/239.55
[51] Int. Cl. .................... 260 239.5; C07c 169/32
[58] Field of Search................................ 260/397.4

[56] References Cited
UNITED STATES PATENTS 3,449,495  6/1969  Bruckner et al.................. 424/243
3,493,588  2/1970  Herzog et al. ................... 260/397.4

Primary Examiner—Elbert L. Roberts
Attorney, Agent, or Firm—Frank R. Trifari; Norman N. Spain

[57] ABSTRACT

The invention relates to novel 16-methylene and 1,2;16-bismethylene retrosteroids of the pregnane series which have, among other properties, a surprisingly high progestational and anti-ovulating activity both on oral and on parenteral administration. After being worked up into preparations the compounds may be used, for example, to maintain frequencies and as contraceptives. A highly active substance according to the invention is the compound 16-methylene-17α-acetoxy-9β, 10α-pregna-4,6-diene-3,20-dione.

13 Claims, No Drawings

16-METHYLENE-17-ACYLOXY-9-β,10-α-PREGNA-4,6-DINENE-3,20 DIONES AND METHODS OF PRODUCING SAME

This is a continuation of application Ser. No. 120,676, filed Mar. 3, 1971, now abandoned.

"Pharmaceutical preparations containing 16-methylene-17α-acyloxy-9β, 10α-pregn-4-ene (or pregna-4,6-diene)-3,20-dione compounds as an active substance, novel 16-methylene-17α-acyloxy-9β, 10α-pregna-4,6-diene-3,20-dione compounds and methods of producing said preparations and novel substances".

From the Applicant's U.S. Pat. No. 3,198,792 it is known that the steroids of the retro-sequence having a 9β, 10α-configuration in contrast to the steroids of the normal sequence, exhibit interesting endocrinological properties.

As examples of retrosteroids the columns 11 to 23 of said Patent Specification contain about 800 substances or groups of substances. Column 15, lines 67 and 72, mentions the following groups of retrosteroids: 16-methylene-17α-acyloxyretroprogresterone compounds and 6-dihydro-16-methylene-17α-acyloxyretroprogresterone compounds.

It has now been found that compounds corresponding to the general formula I

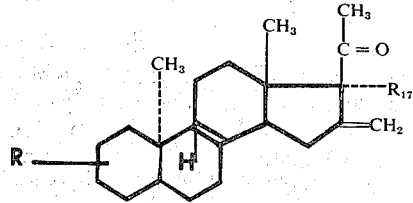

wherein R is a
3-keto-4,6-bisdehydro,
3-keto-1,4,6-trisdehydro,
1,2-methylene-3-keto-4-dehydro,
1,2-methylene-3-keto-4,6-bisdehydro,
1,2-methylene-3-OR-3,5-bisdehydro,
1,2-methylene-3-OR, 4,6-bisdehydro or
3-OR-4,6-bisdehydro group,
in which
OR represents an esterified or etherified hydroxy-group and
$R_{17}$ is an etherified hydroxy-group having 1 to 5 carbon atoms or an esterified hydroxy-group having 1 to 9 carbon atoms,
exhibit a surprisingly high progestational and antiovulatory activity both in oral and parenteral administration. This applies particularly the compounds:

16-methylene-17α-acetoxy-9β, 10α-pregna-4,6-diene-3,20-dione,
16-methylene-17α-propionoxy-9β, 10α-pregna-4,6-diene- 3,20-dione,
16-methylene-17α-acetoxy-9β, 10α-pregna-1,4,6-triene- 3,20-dione,
16-methylene-17α-propionoxy-9β, 10α-pregna-1,4,6-triene- 3,20-dione,
1,2; 16-bismethylene-17α-acetoxy-9β, 10α-pregna-4,6 -diene-3,20-dione,
1,2; 16-bismethylene-17α-propionoxy-9β, 10α-pregna-4,6-diene- 3,20-dione.

The progestational and anti-ovulatory effect of these substances may be characterized as being excellent, particularly in oral administration.

A strong, prolonged activity has been found in the compounds of the formula I in which $R_{17}$ is an etherified hydroxy-group or an esterified hydroxy-group having 4 to 9 carbon atoms. This applies in particular to the substances:

16-methylene-17α-methoxy-9β, 10α-pregna-4,6-diene-3,20-dione,
16-methylene-17α-ethoxy-9β, 10α-pregna-4,6-diene-3,20-dione,
16-methylene-17α-hydroxy-9β, 10α-pregna-4,6-diene-3,20-dione-17-caproate,
1,2; 16-bismethylene-17α-methoxy-9β, 10α-pregna-4,6 -diene-3,20-dione and
1,2; 16-bismethylene-17α-hydroxy-9β, 10α-pregna-4,6 -diene-3,20-dione 17-caproate.

Other active substances according to the invention are:

1,2; 16-bismethylene-17α-hydroxy-9β, 10α-pregn-4-ene- 3,20-dione 17-acetate,
1,2; 16-bismethylene-3,17α-dihydroxy-9β, 10α-pregna-3,5-diene-20-one 3,17-diacetate,
1,2; 16-bismethylene-17α-methoxy-9β, 10α-pregn-4-ene- 3,20-dione,
1,2; 16-bismethylene-17α-hydroxy-9β, 10α-pregn-4-ene- 3,20-dione 17-propionate,
1,2; 16-bismethylene-17α-hydroxy-9β, 10α-pregn-4-ene- 3,20-dione 17-caproate,
1,2; 16-bismethylene-17α-tetrahydropyraniloxy-9β, 10α-pregn-4-ene-3,20-dione,
1,2; 16-bismethylene-17α-hydroxy-9β, 10α-pregn-4-ene- 3,20-dione,
1,2; 16-bismethylene-17α-ethoxy-9β, 10α-pregna-4,6-diene- 3,20-dione,
1,2; 16-bismethylene-17α-tetrahydropyranyloxy-9β, 10α-pregna-4,6-diene-3,20-dione,
16-methylene-17α-methoxy-9β, 10α-pregna-1,4,6-triene- 3,20-dione,
16-methylene-17α-ethoxy-9β, 10α-pregna-1,4,6-triene- 3,20-dione,
16-methylene-17α-hydroxy-9β, 10α-pregna-1,4,6-triene- 3,20-dione 17-caproate,
16-methylene-17α-tetrahydropyranyloxy-9β, 10α-pregna- 1,4,6-triene-3,20-dione,
16-methylene-17α-propoxy-9β, 10α-pregna-4,6-diene-3,20-dione,
16-methylene-17α-propoxy-9β, 10α-pregna-1,4,6-triene-3,20-dione,
1,2; 16-bismethylene-17α-propoxy-9β, 10α-pregna-4,6-diene- 3,20-dione,
1,2; 16-bismethylene-17α-propoxy-9β, 10α-pregna-4-ene-3,20-dione,
1,2; 16-bismethylene-3,17α-dihydroxy-9β, 10α-pregna-4,6-diene-20-one 3,17-diacetate.

It should be noted that if the compounds according to the invention comprise a 1,2-methylene group, this group is in β-position.

Apart from the above-mentioned properties the compounds of the formula I also have high deciduoma-forming properties. Moreover, the compounds are found to be able to maintain pregnancy and of inducing ovulation. The compounds are, in addition, anti-estrogenic.

For reasons of the high level of activity the compounds of the formula I may be employed in small quantities in pharmaceutical preparations for both oral and parenteral administration.

The present invention therefore relates to pharmaceutical preparations containing a compound of the formula I as an active constituent apart from the conventional carrier material. The quantity of active constituent in a preparation according to the invention may vary within wide limits. In general a dosage unit of the preparation according to the invention containing 0.01 to 5 mg of active constituent will yield satisfactory results.

For a good understanding it should be noted that the above-mentioned dosage unit relates to a single daily dosage administered during a plurality of days. If the dosage rate differs therefrom and if, for example, a plurality of dosage units are administered daily or, on the other hand, if one or more dosages is (are) administered in every quarter year, for example, in parenteral use, the quantity of active substance per dosage unit has to be modified accordingly.

Examples of dosage units in accordance with the invention are capsules, implantation capsules, dragées, pills, pessaria, ampullae or flasks of injection liquids and similar forms suitable for therapeutical administration containing the desired quantity of the compound of formula I.

The preparations according to the invention may contain, apart from a compound of the formula I, other known, endocrinologically active substances. The preparation according to the invention may contain, in addition, an estrogenic compound such as ethinylestradiol or mestranol. Such combined preparations according to the invention are mainly used for anti-fertile purposes and for the treatment of endometriosis and dysmenorrhea.

Apart from said anti-fertile use the preparations according to the invention may be suitable for various other therapeutical uses, for example, for the maintenance of pregnancy, for combating habitual or imminent abortus, for combating sterility, acne and hirsutism, dysmenorrhea, menorrhagiene, oligo- and polymenorrhea, primary and secondsary amenorrhea, hyper- and hypomenorrhea, premenstrual tensions, endometrium carcinoms, prostate hypertrophy, endometriosis and for evolation induction.

The preparations are particularly suitable for anti-fertile use. The method of treatment in anti-fertile use of the preparations according to the invention does in principle not differ from the methods conventionally used in this field.

In accordance with the classical method combined preparations according to the invention containing in addition an estrogenic compound may be administered daily in the form of a tablet. It is furthermore possible to administer the combined preparation according to the invention in the sequential method during part of the menstrual cycle, for example, daily for 5 days and to administer an estrogenic substance during another part of the cycle. However, the preparations according to the invention may advantageously be administered in a so-called low-progestation treatment. In this method a progestational substance is administered periodically, for example, daily, for the duration of the cycle. Since it is important in this method, in which no estrogen is used, to have a strongly active progestational substance available, the highly active preparations according to the invention will provide direct advantages.

The aforesaid quantity of active substance (compound of the formula I) per dosage unit of the preparation according to the invention may be further determined in dependence upon the anti-fertile method used as follows:

a. Classical anti-fertile method:
  Dosage rate: daily administration of one tablet for the duration of the cycle.
  Composition of the tablet: 0.1 to 5 mg of 16-methylene-17α-acetoxy-9β, 10α-pregna-4,6-diene-3,20-dione; 0.01 to 0.1 mg of ethinylestradiol completed with carrier material and adjuvants to a tablet weight of 30 to 300 mgs.

b. Sequential method:
  Dosage rate:
    1. daily administration of one tablet for 5 days of the cycle;
    2. daily administration of one tablet for 15 to 16 days of the cycle.
  Composition of tablets:
  The tablet sub 1) has the same composition as mentioned sub a),
    The tablet sub 2) contains; 0.05 to 0.1 mg of mestranol completed with carrier material and adjuvants to a tablet weight of 30 to 300 mgs.

c. "low progestation treatment":
  Dosage rate: daily administration of one tablet for the duration of the cycle.
  Composition of the tablet: 0.01 to 0.5 mg of 16-methylene-17α-acetoxy-9β, 10α-pregna-4,6-diene-3,20-dione, completed with adjuvants and carrier material to a tablet weight of 30 to 300 mgs.

Instead of the afore-mentioned use of oral preparations (tablet)injection preparations may be employed.

An injection preparation according to the invention may be administered once a quarter of a year and it contains 1 to 5 mgs of a compound of the formula I as an active constituent.

The preparations according to the invention may be produced by mixing the active substance with solid carrier material or by dissolving or dispersing it in liquid carrier material to such a quantity that a dosage unit of the preparation of 0.01 to 5 mg of active substance is provided.

If desired, known endocrinologically active substances such as estrogens may be added. They may furthermore be used adjuvants such as surface-active substances, lubricants, binders, disintegration agents and solvents.

Suitable carrier materials for oral preparations such as tablets and dragées are, for example, disaccharides and polysaccharides such as saccharose, lactose, glucose and dextrose, cellulose and cellulose derivatives such as carboxymethyl cellulose, methyl cellulose, ethyl cellulose, hydroxy-ethyl cellulose and hydroxypropyl cellulose, alginic acids, salts of alginic acids and hemicelluloses such as helactomannan. Suitable liquid carrier materials for injection preparations are, for example, arachis oil, sesame oil, soya oil, olive oil and mixtures of these or suchlike vegetable oils, furthermore, isopropylmeristate and ethyloleate.

Suitable binders are, for example, gelatine, pectine, amyloe, agar-agar, tragacanth, polyethylene glycols, arabic gum and polyvinylpyrolidone. Suitable desintegration agents are, for example, aminopectines, starches such as corn starch, potato starch and rice starch, formaline caseine, bentonite, silica and ion-exchangers.

Appropriate lubricants are, for example, polyethylene glycols, stearic acid, salts of stearic acid such as magnesium stearate and aluminium stearate.

Suitable surface-active substances are, for example, wetting agents such as sodium dioctyl sulphosuccinate, sodium laurylsulphate, polyoxyethylene sorbitane, monolaureate, polyoxyethylene alkylether and sulphated cetyloleylalcohol.

Suitable solvents for the production of injection preparations are, for example, methylenechloride and benzylalcohol.

Tablets or dragées according to the invention may be obtained by mixing the active substance in the desired quantity with solid carrier material such as a carrier of the kind mentioned above together with adjuvants such as a kind of starch, magnesium stearate and talcum. The resultant mixture is homogenized and worked up into tablets or dragees. The tablets or dragees may, if desired, be provided with a sugar coating formed, for example, by the following ingredients: talcum, gelatine, gum arabic, potato starch, saccharose and a colorant. Instead of a sugar coating a different film-former may be used, for example, ethylcellulose and polyacrylates. Injection liquids may be obtained by dissolving the active substance in methylenechloride, by dissolving this solution in arachis oil and by subsequently evaporating the solvent. Ampullae and flasks are filled with the resultant solution, sealed and finally sterilized by heating at 120° C for some time.

Further details of the composition of the preparations according to the invention will be apparent from the Examples.

The compounds of the formula I given above are novel substances. These novel compounds according to the invention may be produced by methods known for the production of similar substances or by analogous methods. The compounds of the formula I may be produced: a. by treating a compound of the formula:

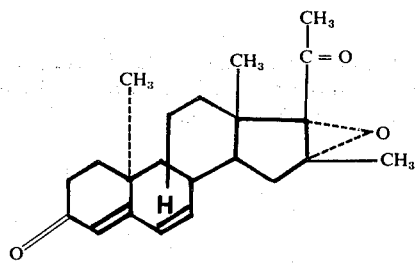

under the action of a catalyst in a solvent with an acylating agent, which results in a compound of the formula:

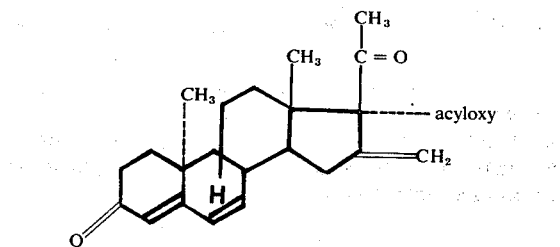

in which the acyloxy-group contains 1 to 9 carbon atoms, b. by subjecting a compound of the formula:

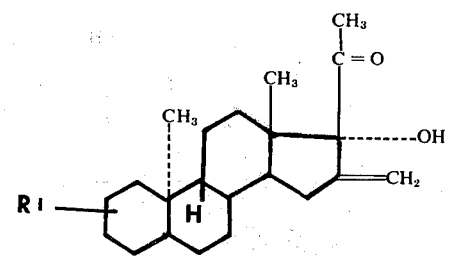

in which R' is a
3-keto-4,6-bisdehydro,
3-keto-1,4,6-trisdehydro,
1,2-methylene-3-keto-4-dehydro or
1,2-methylene-3-keto-4,6-bisdehydro group,
to an etherifying reaction, which results in a compound of the formula:

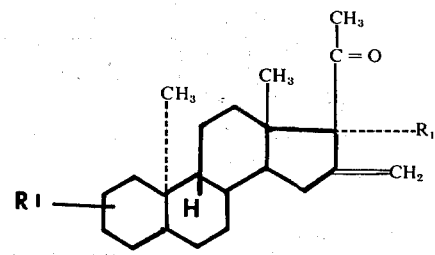

in which R' has the aforesaid meaning and $R_{17}$ represents the same as mentioned above, c. by subjecting a compound of the formula:

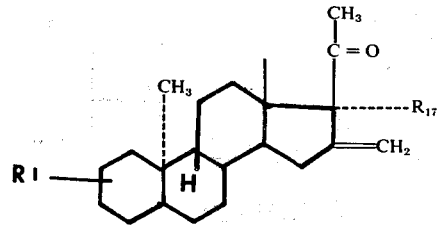

in which $R_{17}$ has the aforesaid meaning and R'' is a
3-keto-4-dehydro,
1,2-methylene-3-keto-4-dehydro,
1,2-methylene-3-OR-3,5-bisdehydro or
3-OR-3,5-bisdehydro group,
in which OR is an etherified or esterified hydroxy-group, to a dehydrating reaction, which results in a compound of the formula:

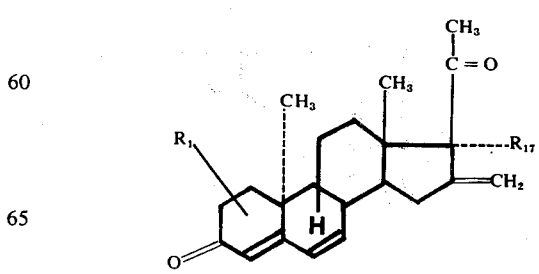

in which $R_1$ is a 1,2-methylene- or a 1,2,3-dehydrogroup and $R_{17}$ has the aforesaid meaning; d. by subjecting a compound of the formula:

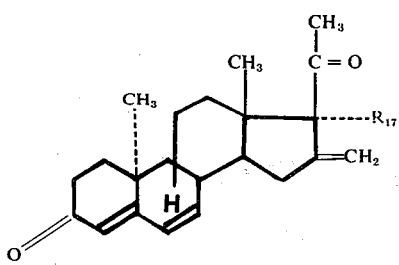

wherein $R_{17}$ has the aforesaid meaning, to a 1,2-dehydration, which results in the formation of the corresponding 3-keto-1,4,6-trisdehydro compound; e. by reacting a compound of the formula

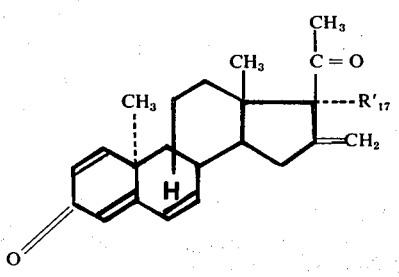

in which $R'_{17}$ is an etherified hydroxy-group having 1 to 5 carbon atoms with dimethylsulphoxonium methylide in an a-protic solvent, which results in a compound of the formula:

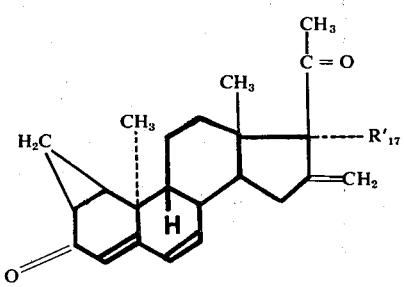

in which $R'_{17}$ has the aforesaid meaning; f. by catalytically hydrating a compound of the formula:

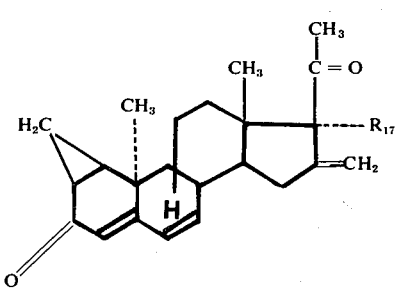

in which $R_{17}$ has the aforesaid meaning, which results in a compound of the formula:

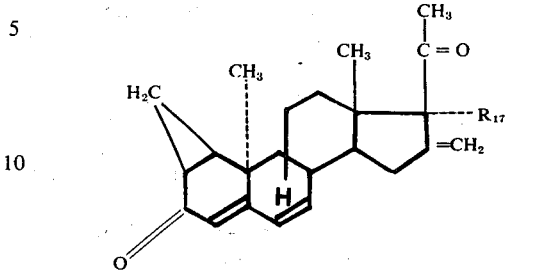

in which $R_{17}$ has the aforesaid meaning; g. by treating a compound of the formula:

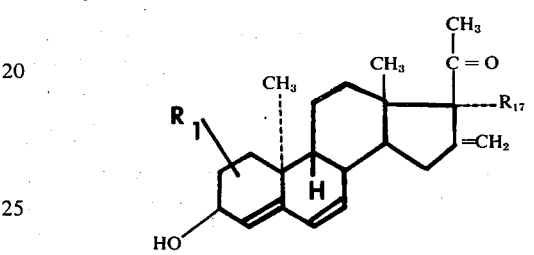

in which $R_1$ is a hydrogen atom or a 1,2-methylene group and
$R_{17}$ has the aforesaid meaning with an alkylating or acylating agent, which results in a compound of the formula:

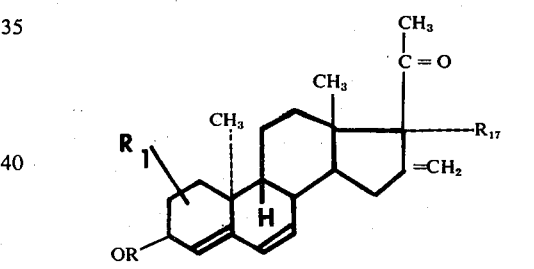

in which $R_1$ and $R_{17}$ have the aforesaid meanings; OR is an etherified or esterified hydroxy-group; h. by subjecting a compound of the formula:

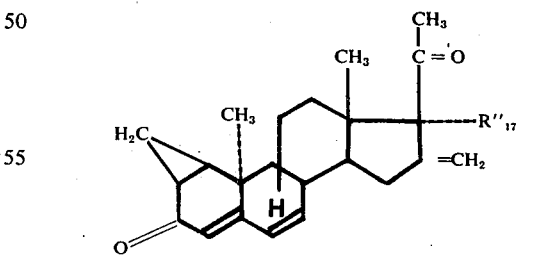

in which $R''_{17}$ is a hydroxy-group, an etherified hydroxy-group having 1 to 5 carbon atoms or an esterified hydroxy-group having 1 to 9 carbon atoms, to an enol-esterification or an enol-etherification which results in a compound of the formula:

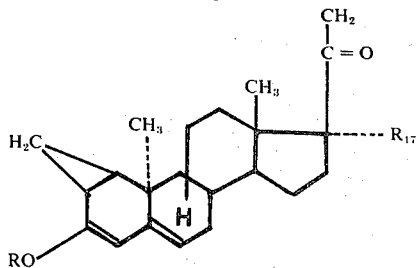

in which $R_{17}$ has the aforesaid meaning and OR is an etherified or an esterified hydroxy-group.

The methods mentioned sub a, b, c, d, e, f, g and h will be described in further detail below. Where reference is made to literature, this means that the process concerned may be carried out in a manner analogous to that described in literature.

Ad a: The acylating reaction is carried out at a reaction temperature which is allowed to vary between room temperature and the boiling point of the solvent employed. A suitable solvent may be an aromatic hydrocarbon such as benzene or toluene. Suitable acylating agents are carboxylic acid anhydrides, carboxylic acid chlorides or carboxylic acids. The catalyst is an acid catalyst such as trifluoroacetic acid anhydride, hydrochloric acid or p-toluene sulphonic acid.

The starting materials of method a) are obtained by the A compound of the formula: processes:

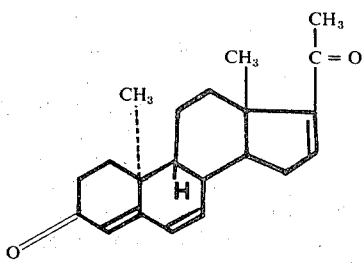

is reacted in the presence of a solvent such as an ether with diazomethane, which results in the formation of a compound of the formula:

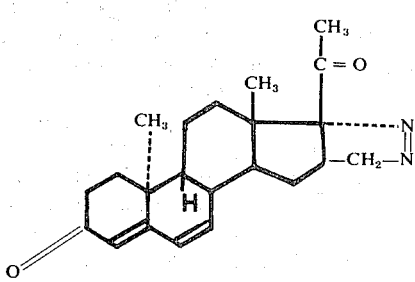

The latter compound is subsequently subjected to a pyrolysis reaction, for example, in paraffin oil at a pyrolysis temperature of about 200°C. The resultant 16-methyl-16-dehydro-compound is finally treated with an oxidizing agent such as organic per-acid or hydrogen peroxide. Especially with an organic per-acid such as m-chloroperbenzoic acid the oxidizing reaction is performed satisfactorily. The reaction with hydrogen peroxide is carried out in an alkaline alcoholic reaction medium, for example, in a reaction medium containing an alkaline hydroxide and a lower alcohol such as ethanol. Ad b: The esterification is performed by the reaction of the starting material with an acylating agent such as a carboxylic acid, a carboxylic acid anhydride or a carboxylic acid chloride in the presence of a catalyst such as p-toluene sulphonic acid, trifluoroacetic acid anhydride or in the presence of an acid binder such as pyridine or collidine.

The etherification is carried out by reacting the starting material with an alkylating agent such as an alkyl halide, for example, methyliodide, methylbromide, ethyliodide or propyliodide. The reaction is performed in the presence of freshly precipitated silver oxide in an inert polar solvent such as formarmide, dimethylformamide or dimethylsulphoxide.

The starting material of method b) can be produced by subjecting the starting material mentioned sub a), in which the 6,7 double bond may be facultative, to a ring-opening reaction.

The ring opening is performed by treating the starting material with an acid catalyst in the presence of a solvent. Suitable catalysts are, for example, inorganic acids such as HCl or HBr or organic acids such as p-toluene sulphonic acid or sulphosalicyclic acid. The solvent may be benzene or toluene. The reaction temperature may fluctuate between room temperature and the boiling point of the solvent.

The product resulting from the ring opening, which corresponds to the formula:

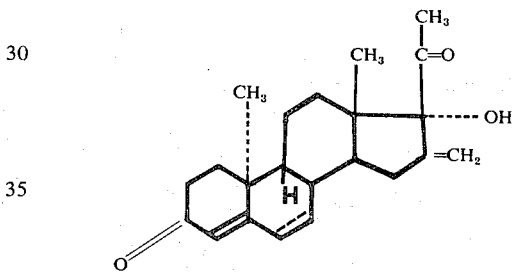

in which the broken line indicates a single or double bond between the carbon atoms 6 and 7, may furthermore be subjected to a 1,2-dehydrating reaction (see method d), which results in the corresponding 3-keto-1,4-bisdehydro-or 3-keto-1,4,6-trisdehydro-compound. The latter substance can subsequently be reacted with dimethylsulphoxoniummethylide in an aprotic solvent, which results in a compound of the formula:

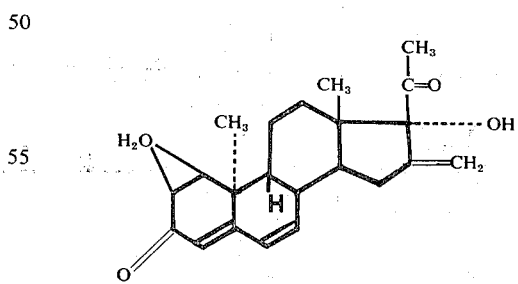

(see method e).

Finally the latter substance may be subjected to a catalytic reduction with palladium as a catalyst, which results in the corresponding 3-keto-4-dehydro-compound.

It should be noted that the above-mentioned reaction with dimethylsulphoxoniummethylide, in which a 1,2-methylene-group is introduced, provides higher yields if the starting product contains a 17-ether-group instead of containing the 17-hydroxy-group as stated. It is therefore advisable to first screening off the 17-hydroxy-group by conversion into an ether-group before the introduction of the 1,2-methylene-group. The conversion into an ether-group may be carried out by reaction with, for example, dihydropyrane or dihydrofurane in a weakly acidic, weakly alkaline or neutral medium, which results in the formation of the 17-tetrahydropyranyloxy- or 17-tetrahydrofuranyl-oxy-group.

The protecting ether-group can be reduced to the initial 17-OH-group by hydrolysis. Ad c: The dehydrating reaction may be carried out by the following processes:

I. Direct dehydration of 3-keto-$\Delta^4$-9$\beta$, 10$\epsilon$-compounds, 1. with a substituted benzoquinone such as chloranyl (E. J. Agnello and G. D. Laubach: J. Am. Chem. Soc. 82, 1960) or 2,3-dichloro-5,6-dicyanobenzoquinone (Brouwers J. Am. Chem. Soc. 8159 91 (1959) H. J. Ringold and A. Turner: Chem. and Ind. 1962, 211).
2. with manganese dioxide (F. Sondheimer et al: J. Am. Chem. Soc. 75 5932 (1953)).

II. The reaction of a $\Delta^{3,5}$-3-enolether (or enolester) steroid
with chloranyl or 2,3-dichloro-5,6-dicyanobenzoquinone (German patent specification Nr. 1,044,077) or with manganese dioxide in acetic acid.

III. Halogenation at the 6-position of a $\Delta^{3,5}$-3-enolether (or enolester) steroid, followed by dehydrohalogenation.

The halogenation of a $\Delta^{3,5}$-3-enolether compound may be carried out with a halogen such as bromine or chlorine (L. H. Knox; J. Am. Chem. Soc. 82, 1230 (1960)) or with N-haloimides such as bromosuccinic imide (the same literature). The halogenation of a $\Delta^{3,5}$-3-enolester compound may also be carried out with a halogen (H. H. Inhofen: C. A. 53 456 (1959)) or with N-haloimides (C. Djerassi: J. Am. Chem. Soc. 77 3827 (1955)).

The dehydrohalogenation is preferably carried out by the reaction with an organic base such as pyridine or collidine.

The starting material of method c), in which a 3-enolether (or enolester) $\Delta^{3,5}$-group is present, may be obtained by:

1. the enoletherification of a 3-keto-$\Delta^4$-compound with an orthoformate ester in the presence of a catalyst, for example, with ethylorthoformate and hydrochloride (A. Serini: c.s. Ber. 71 1766 (1938)) or ethylorthoformate with p-toluene sulphenic acid. (R. Gardi c.s.: J. Org. Chem. 27 688 (1962) and A. D. Cross c.s.: Steroide 6 198 (1963)).

2. The enolesterification may be carried out with the aid of isopropenylacetate in the presence of an acid catalyst such as p-toluene sulphonic acid or sulphuric acid or by means of an axid anhydride in the presence of, for example, p-toluene sulphonic acid.

3. The enolesterification may furthermore be carried out by treating 16-methyl-16-17-oxy-9$\beta$, 10$\alpha$-pregn-4-ene-3,20-dione with an acylating agent in the presence of a catalyst and a solvent. This results in a compound of the formula:

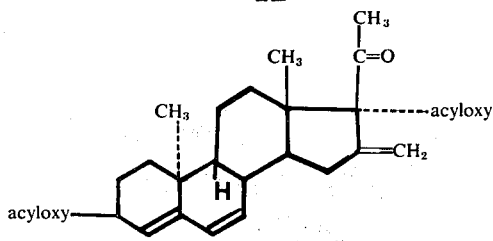

The starting material of method c), in which a 3-keto-4—dehydro-group is present, may be obtained, for example, by converting 9$\beta$, 10$\alpha$-pregna-4,16-diene-3,20-dione by the processes mentioned under a) into 16-methyl-16,17-oxido-9$\beta$, 10$\alpha$-pregn-4-ene-3,20-dione and by converting the latter product by the method sub b) into the corresponding 17-hydroxy-compound, which is finally esterified or etherified, by method b).

Ad d: A double bond of carbon atoms 1 and 2 may be obtained by the following processes:

a) Microbiological 1-dehydration, for example, with coryne bacterium simplex, Nobile c.s. J. Am. Chem. Soc. 77 4184 (1955).

b) Direct 1-dehydration:
1. with selenium dioxide: J. H. Fried c.s.: J. Am. Chem. Soc. 81 1235 (1959),
   A. Bowers c.s.: J. Am. Chem. Soc. 81 5991 (1959).
2. with chloranyl: E. J. Agnello: G. D. Laubach: J. Am. Chem. Soc. 82 4293 (1960),
3. with 2,3-dichloro-5,6-dicyanobenzoquinone D. Burn c.s. Proc. Chem. Soc. 1960 (14).

Ad e: Suitable a-protic solvents are, for example, ethers such as hydration or tetrahydrofurane and dimethylsulphoxide. The reaction temperature may vary between 0°C and 80°C and it preferably lies between 15°C and 30°C. The reagent is produced by treating trimethylsulphoxonium iodide with a base, for example, an alkaline hydride in the presence of a solvent such as dimethylsulphoxide.

Ad f: The catalytic hydration is preferably carried out with the hydratiton catalyst palladium suspended, for example, on $CaCO_3$, $SrCO_3BaSO_3$, $BaSO_4$ or carbon. The reaction takes place in the presence of a solvent such as an aromatic carbohydrate, for example, benzene or toluene.

Ad g: A suitable acylating agent is a carboxylic acid chloride or anhydride in the presence of a base such as pyridine or collidine. The alkylating agent may be an alcohol in the presence of a catalytic quantity of acid, for example, HCl. The starting product of method g) is obtained by reducing the corresponding compound containing a 3-keto-oxygen atom. The reduction takes place by treatment with $Na_2H_4$ in methanol or tetrahydrofurane at a low temperature or with LiAlH (t. OBu)$_3$.

Ad h: The enoletherification and the enolesterification may be carried out in the same manner as described above sub Ad c. The enoletherification may be carried out by treating the starting material with an orthoformate ester in the presence of a catalyst. The enolesterification is carried out by treatment with isopropenylacetate or with an acid anhydride, both in the presence of a catalyst.

The invention furthermore relates to novel compounds of the formula:

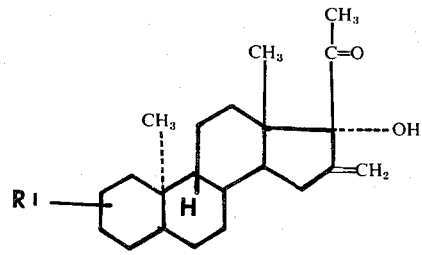

wherein R' has the aforesaid meaning.

These compounds are interesting intermediate substances in the production of compounds of the formula I. The substances can be produced by the method described above sub Ad b.

The invention will be described more fully with reference to the Examples.

EXAMPLES

1. Production of 16-methylene-17α-hydroxy-9β, 10α-pregna-4,6-diene-3,20-dione 17-acetate.

a. (17α, 16 -c)pyrazoline-9β, 10α-pregna-dione.

Diazomethane obtained by adding a solution of 15 g of KOH in 375 ml of 90 % ethanol to a solution of 75 g of tolylsulphonyl-methylnitrosoamide in 1,1 liter of diethylether and by heating the resultant solution is introduced into a solution of 30 g of 9β, 10α-pregna-4,6,16-triene-3,20-dione. The mixture is kept at 0°C for 5 hours and then heated at room temperature. The precipitate (17α,16α-c)-pyrazolino-9β, 10α-pregna-4,6-diene-3,20-dione is filtered off after standing for three days. Melting point 188° to 189°C whilst decomposing.

b. 16-methyl-9β, 10α-pregna-4,6,16-triene-3,20-dione.

31 g of (17α,16α-c)-pyrazolino-9β, 10α-pregna-4,6-diene-3,20-dione is slowly added at a temperature of 190° C to 60 ml of paraffin oil and 1 liter of pyridine. The addition is carried out in an N₂ atmosphere. After the development of gas has terminated, the reaction mixture is cooled and the crude product is filtered off. Recrystallisation from methylene chloride/hexane yielded pure 16-methyl-9β, 10α-pregna-4,6,16-triene-3,20-dione. Melting point 156.5° to 158.5°C.

c. 16β-methyl-16, 17-oxido-9β, 10α-pregna-4,6-diene-3,20-dione.

To a solution of 10 g of 16-methyl-9β, 10α-pregna-4,6,16-triene-3,20-dione in 250 ml of 1,2-dichloroethane is added a solution of metachloroperbenzoic acid (75% excess quantity) in 50 ml of ether. Temperature 10°C. The mixture is kept at a temperature of 15°C for 45 hours and then washed successively with a 5% sodium bisulphate solution, a 5% bicarbonate solution and water. The resultant residue is dried and the solvents are evaporated. The product is purified chromatographically. Melting point of 16-methyl-16, 17-oxido-9β, 10α-pregna-4,6-diene-3,20-dione is 144° to 146°C.

Apart from the above-mentioned oxidation with a per-acid oxidation may be carried out with H₂O₂.

d. 16-methylene-17α-hydroxy-9β, 10α-pregna-4,6-diene-3,20-dione.

2.1 g of 16β-methyl-16, 17-oxido-9β, 10α-pregna-4,6-diene-3,20-dione is dissolved in 50 ml of benzene, after which 84 mg of p-toluene sulphonic acid is added. The mixture is refluxed for 4 hours, then cooled and subsequently washed with a 5% NaCO₃ solution in water. The mixture is dried, the solvents are evaporated and the residue is crystallized from ether. Melting point of the resultant 16-methylene-17α-hydroxy-9β, 10α-pregna-4,6-diene-3,20-dione is 206° to 208°C.

e. 16-methylene-17α-hydroxy-9β, 10α-pregna-4,6-diene- 3,20-dione 17-acetate.

A mixture of 1.4 g of 16-methylene-17α-hydroxy-9β, 10α-pregna-4,6-diene-3,20-dione and 1.4 g of p-toluene sulphonic acid in 60 ml of acetic acid and 12 ml of acetic acid anhydride is kept at room temperature for 2 hours. The mixture is then poured out in water and extracted with methylenechloride. The extract is washed with water and 5% NaHCO₃ solution and subsequently dried. After evaporation of the solvents the residue is crystallized from ether. Melting point of 16-methylene-17α-hydroxy-9β, 10α-pregna-4,6-diene-3,20-dione 17-acetate is 145° to 146°C.

2. 16-methylene-17α-hydroxy-9β, 10α-pregna-4,6-diene-3,20-dione 17-acetate

A solution of 1.1 g of 16β-methyl-16, 17-oxido-9β, 10α-pregna-4,6-diene-3,20-dione in 10 ml of acetic acid and 2 ml of trifluoroacetic acid anhydride is heated at 60°C in a nitrogen atmosphere for 15 minutes. After cooling and conventional processing 16-methylene-17α-hydroxy-9β, 10α-pregna-4,6-diene-3,20-dione 17-acetate having a melting point of 145° to 145.5°C is obtained.

3. 16-methylene-17α-hydroxy-9β, 10α-pregna-4,6-diene-3,20-dione 17-acetate

In the same manner as described in Example 1, but starting from 9β, 10α-pregna-4,6-diene-3,20-dione, the compound 16-methylene-17α-hydroxy-9β, 10α-pregn-4-ene-3,20-dione 17-acetate is synthetized. Melting point 190° to 194°C.

The latter compound is treated with cloranyl in the manner described in Coll. Czech. Chem. Comm. 24 2351–2359 (1964), the result being 16-methylene-17α-hydroxy-9β, 10α-pregna-4,6-diene-3,20-dione 17acetate. Melting point 145° to 146°C.

4. 16-methylene-17α-hydroxy-9β, 10α-pregna-4,6-diene-3,20-dione 17-acetate a. Production of 3,17α-dihydroxy-16-methylene-9β, 10αpregna-3,5-diene-20-one-3,17-diacetate A solution of 10.6 g of 16-methyl-16, 17-oxido-9β, 10α-pregn-4-ene-3,20-dione and 0.175 g of p-toluene sulphonic acid in 250 ml of anhydrous toluene and 48 ml of acetic acid anhydride is boiled in a nitrogen atmosphere under anhydrous conditions. After about 3.5 hours 130 ml of toluene is distilled off and the solution is decanted into a mixture of 500 g of glacial water and 200 ml of pyridine. The water layer is extracted twice with methylenechloride, the combined extracts are washed with water, dried and finally evaporated to dryness. Recrystallisation of the resultant crystalline product in methanol with a small addition of pyridine yields pure 3,17α-dihydroxy-16-methylene-9β, 10α-pregna-3,5-diene-20-one 3,17-diacetate. Melting point 160° to 161°C.

b. Production of 6α-(6β-)chloro-16-methylene-17α-hydroxy-9β, 10α-pregna-4-ene-3,20-dione 17-acetate.

To a stirred cold solution of 8.1 g of 3,17α-dihydroxy-16-methylene-9β, 10α-pregn-3,5-diene-20-one 3,17-diacetate in 130 ml of ether are added a solution of 15 g of potassium acetate in 330 ml of acetic acid and 55 ml of water and a solution of 1.1 eq. of chlorine in 37 ml of acetic acid. Temperature −10°C. After conventional processing the resultant, crude product is chromatographed, the result being 7.9 g of a mixture of 6α- and 6β-chloro-16-methylene-17α-hydroxy-9β, 10α-pregn-4-ene-3,20-dione 17-acetate.

c. Production of 16-methylene-17α-hydroxy-9β, 10α-pregna-4,6-diene-3,20-dione 17-acetate.

The product resulting from (b) is dissolved in pyridine and heated at 90°C for 2 hours. The processing yields 16-methylene-17α-hydroxy-9β, 10α-pregna-4,6-diene-3,20-dione 17-acetate having a melting point of 145° to 146°C.

5. 16-methylene-17α-hydroxy-9β, 10α-pregna-4,6-diene-3,20-dione 17-propionate To a solution of 200 mg of 16-methylene-17α-hydroxy-9β, 10α-pregna-4,6-diene-3,20-dione in 8 ml of propionic acid is added 2 ml of trifluoroacetic acid anhydride and the mixture is heated at 60°C in a nitrogen atmosphere for 45 minutes. After processing and chromatographic purification 16-methylene-17α-hydroxy-9β, 10α-pregna-4,6-diene-3,20-dione 17-propionate is obtained, which has a melting point of 108° to 110°C.

6. 16-methylene-17α-hydroxy-9β, 10α-pregna-4,6-diene-3,20-dione 17-butyrate

In the same manner as described in Example 5, the difference being, however, that instead of using propionic acid, butyric acid is used. 16-methylene-17α-hydroxy-9β, 10α-pregna-4,6-diene-3,20-dione 17-butyrate is obtained. Melting point 148° to 149° C. If instead of propionic acid, capronic acid or capryl acid is used, the result is 16-methylene-17α-hydroxy-9β, 10α-pregna-4,6-diene-3,20-dione 17-caproate having a melting point of 75° to 77°C and 16-methylene-17α-hydroxy-9β, 10α-pregna-4,6-diene-3,20-dione 17-decanoate respectively.

7. Production of 17α-hydroxy-16-methylene-9β, 10α-pregna-1,4,6-triene-3,20-dione 17-acetate a. 17α-hydroxy-16-methylene-9α, 10α-pregna-1,4,6-triene-3,20-dione.

To a stirred solution of 0.5 g of 17α-hydroxy-16-methylene-9β, 10α-pregna-4,6-diene-3,20-dione and 0.46 g of 2,3-dichloro-5,6-dicyanobenzoquinone in 10 ml of dry dioxane was added 0.06 ml of a solution of dry hydrochloride gas in dry oxane (180 mg per ml). After standing at 22°C for 90 minutes the reaction mixture was stirred for 15 minutes with 0.5 g of calciumcarbonate. Subsequently the solid material was filtered off and the filtrate was refluxed for 90 minutes. After cooling to 15°C the solid material was filtered off and the filtrate was evaporated practically to dryness at a reduced pressure. The resultant residue was dissolved in 10 ml of methylenechloride and 10 ml of petroleumether (40°to 65°C). This solution was washed with three supplies in 10 ml of 1N caustic soda lye and finally with water until a neutral layer was obtained.

The solvent of the solution dried on sodium sulphate was evaporated at reduced pressure and the resultant residue was chromatographed on silicagel. The final yield was 17α-hydroxy-16-methylene-9β, 10α-pregna-1,4,6-triene-3,20-dione having a melting point of 203° to 205°C.

b. 17α-hydroxy-16-methylene-9β, 10α-pregna-1,4,6-triene-3,20-dione 17-acetate.

From 17α-hydroxy-16-methylene-9β, 10α-pregna-4,6-diene-3,20-dione 17-acetate was obtained in the manner described above sub a) the 17α-hydroxy-16-methylene-9β, 10α-pregna-1,4,6-triene-3,20-dione 17-acetate. Melting point 203° to 204°C.

8. Production of 17α-hydroxy-1,2;16-bismethylene-9β, 10α-pregna-4,6-diene-3,20-dione 17-acetate a. 17α-hydroxy-1β,2; 16-bismethylene-9β, 10α-pregna-4,6-diene-3,20-dione.

A solution of 1.7 g of trimethylsulphoxonium iodide and 0.4 g of sodium hydride (oil suspension 1:1) in 20 ml of dimethyl-sulphoxide was stirred at 20°C for 90 minutes and subsequently filtered. 2 ml of the filtrate was added to a stirred solution of 200 mg of 17α-hydroxy-16-methylene-9β, 10α-pregna-1,4,6-triene-3,20-dione in 2 ml of dry tetrahydrofurane. This mixture was stirred at 20°C for 6 hours and then poured out in 20 ml of glacial water. It was extracted with three supplies of 5 ml of benzene/ether (1:1) and the common extracts were washed in order of succession with three portions of 10 ml of water, three portions of 10 ml of 0.5N caustic soda lye and finally with water until a neutral layer was obtained. The solvent of the solution dried on sodium sulphate was evaporated at reduced pressure and the resultant residue was chromatographed through silicagel. Crystallisation from a mixture of ether and hexane (1:1) yielded finally 17α-hydroxy-1β, 2; 16-bis-methylene-9β, 10α-pregna-4,6-diene-3,20-dione having a melting point of 237° to 239°C.

b. 17α-hydroxy-1β,2;16-methylene-9β, 10α-pregna-4,6-diene 3,20-dione 17-acetate.

A solution of 60 mg of 17α-hydroxy-1β,2; 16-bismethylene-9β, 10α-pregna-4,6-diene-3,20-dione and 60 mg of paratoluene sulphonic acid in 3 ml of acetic acid and 0.6 ml of acetic acid anhydride, after stirring at 24° C for 2 hours, was poured out in 20 ml of glacial water. Extraction was carried out with three portions of 5 ml of dichloromethane and after the addition of 15 ml of n-hexane to the extract it was washed in order of succession with four portions of 15 ml of water and 5% sodium carbonate solution until the washed layer was alkaline and finally with water until the washed layer was neutral. The solvent of the solution dried on sodium sulphate was distilled off at reduced pressure and the residue was chromatographed on silicagel. After evaporation and crystallisation from a mixture of acetone and hexane (1:2) 17α-hydroxy-1β,2;16-bismethylene-9β, 10α-pregna-4,6-diene-3,20-dione 17-acetate having a melting point of 228° to 230°C was finally obtained.

9. Production of 17α-hydroxy-1,2;16-bismethylene-9β, 10α-pregna-4-ene-3,20-dione 17-acetate a. 17α-hydroxy-1β,2:16-bismethylene-9β, 10α-pregn-4-ene-3,20-dione.

1.76 g of 17α-hydroxy-1β, 2;16-bismethylene-9β, 10α-pregna-4,6-diene-3,20-dione was added to the hydrating mixture of 1 g of palladium on calcium-carbonate and 50 ml of toluene.

After the absorption of the theoretical quantity of hydrogen the reaction mixture was filtered and subsequently the solvent was distilled off at reduced pressure. The residue was crystallized from acetone and finally 17α-hydroxy-1β,2;16-bismethylene-9β, 10α-pregn-4-ene-3,20-dione was obtained.

b. 17α-hydroxy-1β,2;16-bismethylene-9β, 10α-pregn-4-ene-3,20-dione 17-acetate.

1.97 g of 17α-hydroxy-1β,2;16-bismethylene-9α, 10α-pregna-4,6-diene-3,20-dione 17-acetate was added to a hydrating mixture of 1 g of palladium on calciumcarbonate and 50 ml of toluene. After the absorption of the theoretical quantity of hydrogen the reaction mixture was filtered and subsequently the solvent was distilled off at reduced pressure. The residue was crystallized from acetone and finally 17α-hydroxy-1β,2;16-bismethylene-9β, 10α-pregn-4-ene-3,20-dione 17-acetate was obtained.

10. Production of 3,17α-dihydroxy-1β,2;16-bismethylene-9β, 10α-pregna-3,5-diene-20-one 3,17-diacetate From a solution of 3.3 g of 17α-hydroxy-1β,2;16-bismethylene-9β, 10α-pregn-4-ene-3,20-dione 17-acetate and 1.4 g of p-toluene-sulphonic acid in 200 ml of dry benzene was distilled off 100 ml, whilst stirring. After the addition of 33 ml of isopropenylacetate, 150 ml of benzene was distilled off within 4 hours through a nail array of a length of 25 cms. The reaction mixture was subsequently cooled in ice to 10°C and poured out in a mixture of 200 ml of glacial water and 40 ml of pyridine. The organic layer was separated out and the water layer was subsequently extracted from 50 ml of ether. The common extracts were washed with five portions of 100 ml of water. The solvent of the solution dried on sodium sulphate was distilled off at reduced pressure and the residue was crystallized from methanol. The yield was 3,17α-dihydroxy-1β,2;16-bismethylene-9β, 10α-pregna-3,5-diene-20-one 3,17-diacetate. This compound was also obtained by dissolving 2,6 g of 17α-hydroxy-1β,2;16-bismethylene-9β, 10α-pregn-4-ene-3,20-dione in 60 ml of acetic acid anhydride, to which was added 2,6 g of p-toluene sulphonic acid. This mixture was kept at room temperature for 24 hours and subsequently poured out in a mixture of pyridine and water. The precipitate was filtered off and recrystallized from methanol.

The yield was pure 3,17α-dihydroxy-1β,2;16-bismethylene-9β, 10α-pregna-3,5-diene-20-one 3,17-diacetate.

11. Production of 17α-methoxy-16-methylene-9β, 10αpregna-4,6-diene-3,20-dione.

To a solution of 500 mg of 17α-hydroxy-16-methylene-9β, 10α-pregna-4,6-diene-3,20-dione in 9.8 ml of dry dimethylformamide is added 4.9 ml of methyliodide and 1.0 g of freshly produced silver oxide. The mixture is stirred in a nitrogen atmosphere for 16 hours, after which the solid substance is filtered off. The filtrate is poured out in water, extracted from methylenechloride and the extract is washed with water. After drying and evaporation to dryness the resultant residue is chromatographed on silicagel. Crystallisation from a mixture of acetone and hexane (1:2) finally yields pure 17α-methoxy-16-methylene-9β, 10α-pregna-4,6-diene-3,20-dione having a melting point of 189° to 191°C.

12. Production of 17α-ethoxy-16-methylene-9β, 10α-pregna-4,6-diene-3,20-dione In the manner described in Example 11, but starting from 17α-hydroxy-16-methylene-9β, 10α-pregna-4,6-diene-3,20-dione, using ethyliodide instead of methyliodide, 17α-ethoxy-16-methylene-9β, 10α-pregna-4,6-diene-3,20-dione having a melting point of 146° to 147°C is obtained.

13. Production of 3α, 17α-dihydroxy-16-methylene-9β, 10α-pregna-4,6-diene-20-one 3,17-diacetate a. 3α, 17α-dihydroxy-16-methylene-9β, 10α-pregna-4,6-diene-20-one 17-acetate.

To a solution of 0.6 g of 17α-hydroxy-16-methylene-9β, 10α-pregna-4,6-diene-3,20-dione 17-acetate in 15 ml of dry tetrahydrofurane is added 2 g of LiAlH (t-OBu)₃, after which for 40 hours at 20°C the mixture is stirred in a nitrogen atmosphere. To the reaction mixture is then added acetic acid until pH = 6. The mixture is then poured out in glacial water and extracted from methylenechloride. The extract is washed with glacial water, cold 1N NaOH and water, dried and evaporated to dryness. The resultant residue, subsequent to crystallisation from ether, yields 3α, 17α-dihydroxy-16-methylene-9β, 10α-pregna-4,6-diene-20-one 17-acetate, having a melting point of 182° to 183°C.

b. 3α, 17α-dihydroxy-16-methylene-9β, 10α-pregna-4,6-diene-20-one 3,17-diacetate.

0.167 g of 3α, 17α-dihydroxy-16-methylene-9β, 10α-pregna-4,6-diene-20-one 17-acetate in a mixture of 0.8 ml of dry pyridine and 0.4 ml of acetic acid anhydride, after standing at 20°C for 24 hours, is poured out in glacial water. The precipitate is filtered off and absorbed in methylenechloride. This solution is subsequently washed with water, dried and evaporated to dryness. The residue, subsequent to crystallisation from ether, yields 3α, 17α-dihydroxy-16-methylene- 9β, 10α-pregna-4,6-diene-20-one 3,17-diacetate having a melting point of 150° to 152°C.

14. Production of 3-ethoxy-17α-hydroxy-16-methylene-9β, 10α-pregna-4,6-diene-20-one acetate To a solution of 0.15 g of 3α, 17α-dihydroxy-16-methylene-9β, 10α-pregna-4,6-diene-20-one 17-acetate in 10 ml of dry ethanol and 15 ml of tetrachlorocarbon is added 0.25 ml of concentrated hydrochloric acid (36%), after which the mixture is refluxed for 15 minutes. The mixture is then cooled and sodium bicarbonate is added for neutralisation. Subsequently the mixture is poured out in water and extracted from methylchloride and after washing with water and drying the extract is evaporated to dryness. The resultant residue is chromatographed on silicagel and this yields pure 3-ethoxy-17α-hydroxy-16-methylene-9β, 10α-pregna-4,6-diene-20-one 17-acetate having a melting point of 154° to 156°C (ether + n-hexane).

15. By mixing the active substance(s) in a finely divided state with solid carrier material and adjuvants tablets and dragees of the following compositions are made; in some cases the tablet or dragee is provided with a sugar layer.

a. Tablet:

| | |
|---|---|
| Active substance, for example, 16-methylene-17α-hydroxy-9β, 10α-pregna-4,6-diene-3,20-dione 17-acetate: | 0.2 mg |
| ethinylestadiol | 0.05 mg |
| lactose | 56.0 mg |
| sugar powder | 30.0 mg |
| potato starch | 6.0 mg |
| talcum | 6.75 mg |
| magnesium stearate | 1.0 mg |
| Total weight | 100.0 mg |

Tablet diameter 6.3 mms.

-continued b. Tablet:
| | |
|---|---|
| 16-methylene-17α-hydroxy-9β, 10α-pregna-4,6-diene-3,20-dione 17-acetate: | 0.02 mg |
| lactose | 24.98 mg |
| corn starch | 6.0 mg |
| microcrystalline cellulose | 6.0 mg |
| talcum | 2.5 mg |
| magnesium stearate | 0.5 mg |
| Total weight | 40.0 mg |

Tablet diameter: 4 mms.

c. Dragée:
Dragée core:
| | |
|---|---|
| 16-methylene-17α-hydroxy-9β, 10α-pregna-4,6-diene-3,20-dione 17-acetate: | 0.10 mg |
| mestranol | 0.08 mg |
| lactose | 35.0 mg |
| saccharose | 15.0 mg |
| corn starch | 5.0 mg |
| talcum | 3.82 mg |
| magnesium stearate | 1.0 mg |
| Total core weight | 60.0 mg |

Dragée peel:
| | |
|---|---|
| Talcum | 18.0 mg |
| saccharose | 71.23 mg |
| potato starch | 0.10 mg |
| gelatine | 0.30 mg |
| arabic gum | 0.30 mg |
| canauba wax | 0.02 mg |
| shellack wax | 0.02 mg |
| Dammar resin | 0.03 mg |
| Dragée weight | 90 mg |
| | 150 mg |

16. Clinical tests with the substance 16-methylene-17α-hydroxy-9β, 10α-pregna-4,6-diene-3,20-dione 17-acetate Test object and method:

The substance was tested on four women suffering from amenorrhea. One of the four had primary amenorrhea accompanied by streak ovaries and the other three women had secondary amenorrhea for 2, 8 and 15 years.

For 20 to 25 days each of the patients obtained ethinyl estradiol by oral administration in a dosage of 50 μg a day and for the last 10 to 12 days they obtained a 1 mg-tablet of the substance to be tested twice a day. Immediately prior to the administration of the substance to be tested i.e. 16-methylene-17α-hydroxy-9β, 10α-pregna-4,6-diene-3,20-dione 17-acetate, the mucus cervex (Spinnbarkeit and microscopy) was examined, whilst furthermore biopsy of the endometrium and examination of vaginal lubricant were carried out. The same examinations were repeated at the end of the treatment with the substance to be tested.

Results:

In the four patients a quite distinct alteration of the properties of the mucus cervex prior to and after the treatment with the above-mentioned substance was assessed. These alterations are:

1. A marked decrease quantitatively;
2. an alteration of the appearances, i.e., from translucent to opaque;
3. a reduction of the Spinnbarkeit from 9.5 cms on an average to 2.25 cms.

The biopsy of the endometrium after the treatment with the substance to be tested provided a distinct impression of subnuclear vacuolisation or intraluminal secretion in the four patients. With two of the four patients it has been assessed that the treatment with the substance to be tested gave rise to a drop of the karyopyknotic index.

What is claimed is:

1. A compound of the formula:

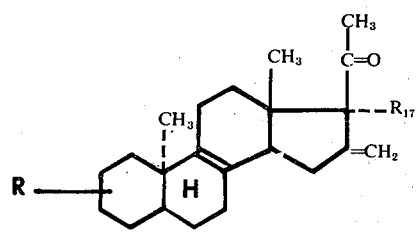

wherein R is a
3-keto-4,6-bisdehydro,
3-keto-1,4,6-trisdehydro,
1,2-methylene-3-keto-4-dehydro,
1,2-methylene-3-keto-4,6-bisdehydro,
1,2-methylene-3-OR-3,5-bisdehydro,
1,2-methylene-3-OR-4,6-bisdehydro or a
3-OR-4,6-bisdehydro-group,
OR representing an esterified or an etherified hydroxy-group and $R_{17}$ being an etherified hydroxy-group having 1 to 5 carbon atoms or an esterified hydroxy-group having 1 to 9 carbon atoms.

2. As the compound of claim 1, 16-methylene-17α-acetoxy-9β, 10α-pregna-4,6-diene-3,20-dione.

3. As the compound of claim 1, 16-methylene-17α-propionoxy-9β, 10α-pregna-4,6-diene-3,20-dione.

4. As the compound of claim 1, 16-methylene-17α-acetoxy-9β, 19α-pregna-1,4,6-triene-3,20-dione.

5. As the compound of claim 1, 16-methylene-17α-propionoxy-9β, 10α-pregna-1,4,6-triene-3,20-dione.

6. As the compound of claim 1, 1,2;16-bismethylene-17α-acetoxy-9β, 10α-pregna-4,6-diene-3,20-dione.

7. As the compound of claim 1, 1,2;16-bismethylene-17α-propionoxy-9β, 10α-pregna-4,6-diene-3,20-dione.

8. As the compound of claim 1, 16-methylene-17α-methoxy-9β, 10α-pregna-4,6-diene-3,20-dione.

9. As the compound of claim 1, 16-methylene-17α-hydroxy-9β, 10α-pregna-4,6-diene-3,20-dione 17-caproate.

10. As the compound of claim 1, 1,2;16-bismethylene-17α-methoxy-9β, 10α-pregna-4,6-diene-3,20-dione.

11. And the compound of claim 1, 1,2;16-bismethylene-17α-hydroxy-9β, 10α-pregna-4,6-diene-3,20-dione 17-caproate.

12. As a compound of claim 1, 16-methylene-17α-ethoxy-9β, 10α-pregna-4,6-diene-3,20-dione.

13. A compound of the formula

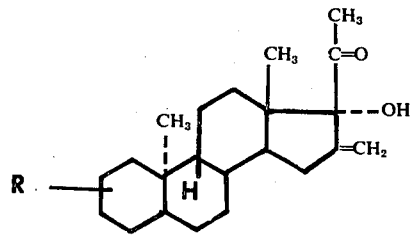

wherein R' is a
3-keto-4,6-bisdehydro,
3-keto-1,4,6-trisdehydro,
1,2-methylene-3-keto-4-dehydro,
1,2-methylene-3-keto-4,6-bisdehydro-group.

* * * * *

UNITED STATES PATENT AND TRADEMARK OFFICE
CERTIFICATE OF CORRECTION

PATENT NO. : 3,917,657
DATED : November 4, 1975
INVENTOR(S) : HARMEN VAN KAMP ET AL It is certified that error appears in the above-identified patent and that said Letters Patent are hereby corrected as shown below:

Col. 20, lines 54-60, the formula should read:

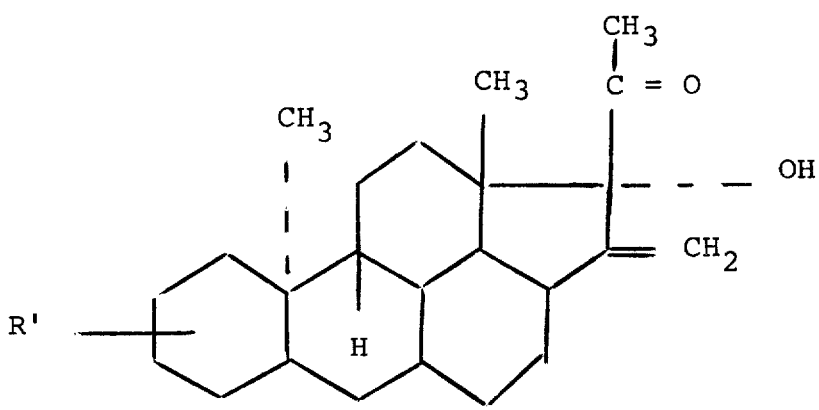

Col. 20, line 66, "-dehydro," should read -- -dehydro or --.

Signed and Sealed this fifth Day of July 1977

[SEAL]

Attest:

RUTH C. MASON
Attesting Officer

C. MARSHALL DANN
Commissioner of Patents and Trademarks